(12) United States Patent
Levin et al.

(10) Patent No.: US 7,814,745 B2
(45) Date of Patent: Oct. 19, 2010

(54) APPROACH FOR DELIVERING A LIQUID REDUCTANT INTO AN EXHAUST FLOW OF A FUEL BURNING ENGINE

(75) Inventors: Michael Levin, Ann Arbor, MI (US); Sandro Balestrino, Plymouth, MI (US); Daniel Michael Kabat, Oxford, MI (US); Furqan Zafar Shaikh, Troy, MI (US); Bret Alan Zimmerman, Grosse Pointe Farms, MI (US); Jeremy Keller, Windsor, CA (US); Scott Donald Cooper, Ann Arbor, MI (US); Kris Kantebet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 631 days.

(21) Appl. No.: 11/779,235

(22) Filed: Jul. 17, 2007

(65) Prior Publication Data

US 2009/0019843 A1 Jan. 22, 2009

(51) Int. Cl.
*F02B 27/04* (2006.01)
*F01N 3/00* (2006.01)
*F01N 3/10* (2006.01)
*F01N 1/00* (2006.01)

(52) U.S. Cl. .............. 60/286; 60/273; 60/295; 60/301; 60/303; 60/324

(58) Field of Classification Search ............... 60/286, 60/295, 303, 273, 296, 301, 324
See application file for complete search history.

(56) References Cited

U.S. PATENT DOCUMENTS

| | | | |
|---|---|---|---|
| 1,242,975 A | 10/1917 | Planche | |
| 4,106,287 A | 8/1978 | Auclair et al. | |
| 4,255,121 A | 3/1981 | Sugimoto | |
| 4,370,304 A | 1/1983 | Hendriks et al. | |
| 5,522,218 A * | 6/1996 | Lane et al. | 60/274 |
| 6,449,947 B1 | 9/2002 | Liu et al. | |
| 6,516,610 B2 * | 2/2003 | Hodgson | 60/286 |
| 6,539,708 B1 | 4/2003 | Hofmann et al. | |
| 2002/0108368 A1 | 8/2002 | Hodgson | |
| 2004/0050037 A1 | 3/2004 | Betta et al. | |
| 2004/0237511 A1 | 12/2004 | Ripper et al. | |
| 2005/0172615 A1 | 8/2005 | Mahr | |
| 2009/0044524 A1 * | 2/2009 | Fujino | 60/303 |

FOREIGN PATENT DOCUMENTS

| | | |
|---|---|---|
| DE | 19806265 | 7/1999 |
| EP | 0712756 | 5/1996 |
| EP | 894523 | 2/1999 |
| WO | WO 2006123511 A1 * | 11/2006 |

* cited by examiner

*Primary Examiner*—Thomas E Denion
*Assistant Examiner*—Audrey Klasterka
(74) *Attorney, Agent, or Firm*—Allan J. Lippa; Alleman Hall McCoy Russell & Tuttle LLP

(57) ABSTRACT

An exhaust system for an internal combustion engine for a vehicle is provided. The system comprises an exhaust passage with an angled injector and a plurality of mixing devices.

20 Claims, 4 Drawing Sheets

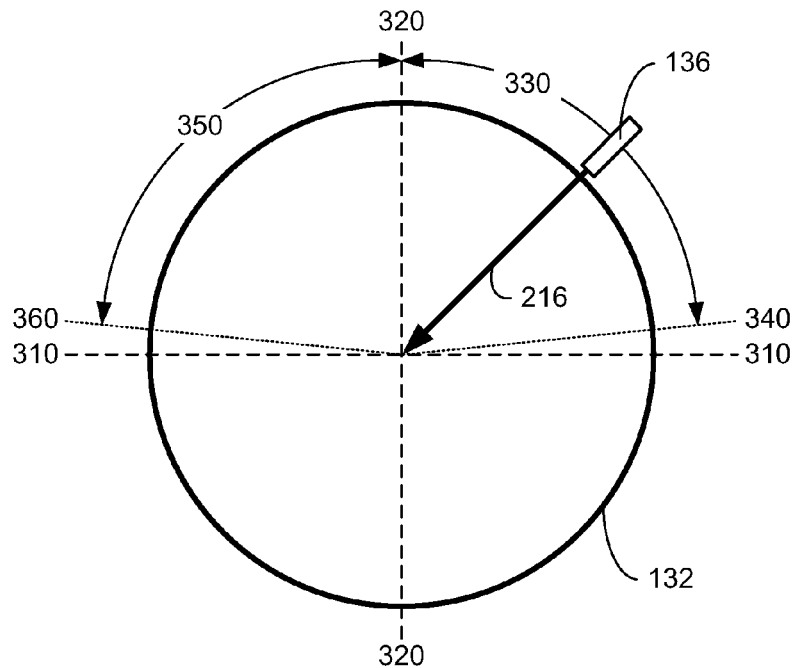
FIG. 3
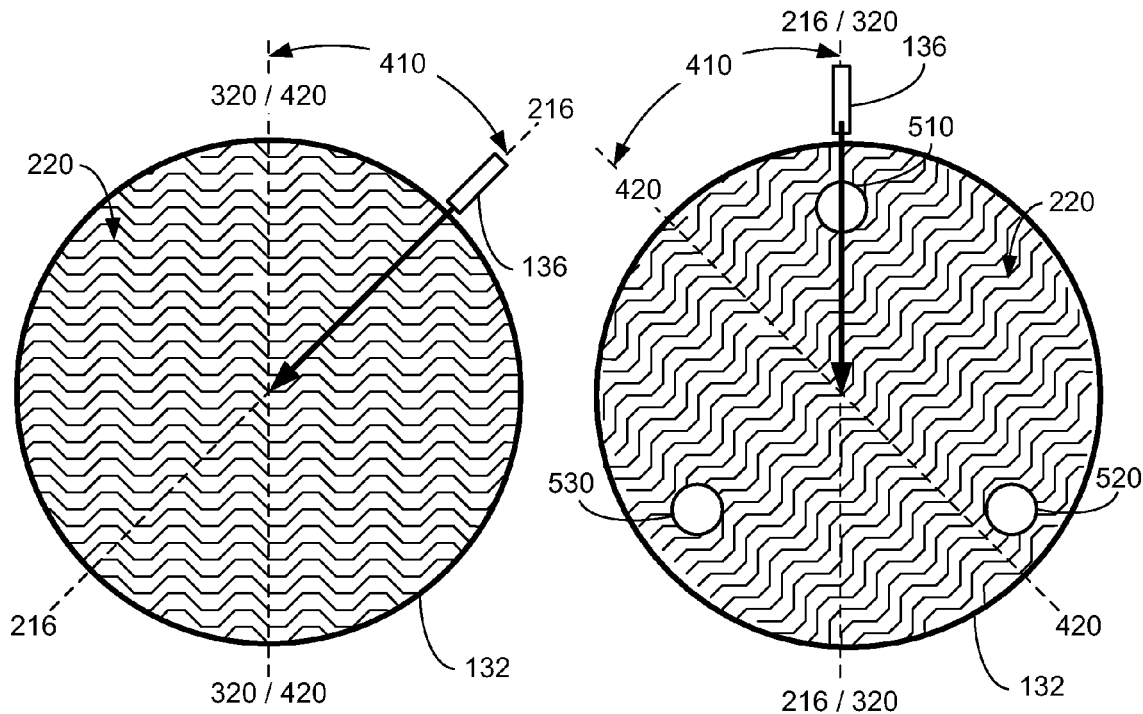
FIG. 4
FIG. 5

APPROACH FOR DELIVERING A LIQUID REDUCTANT INTO AN EXHAUST FLOW OF A FUEL BURNING ENGINE

BACKGROUND AND SUMMARY

Exhaust after-treatment systems may be used to treat exhaust gases produced by a fuel burning engine. As one example, diesel engines may utilize an exhaust system that includes a selective catalytic reduction (SCR) system for reducing the amount of NOx that is ultimately discharged to the surrounding environment during operation of the engine. An SCR system may utilize the injection of a liquid reductant such as ammonia or urea into the exhaust gases where they may be mixed and absorbed onto a catalyst. The liquid reductant as it is evaporated and/or mixed with the exhaust gases can react with the nitrogen oxide (NOx) component of the exhaust gases to form water vapor and nitrogen gas.

The use of SCR systems in non-stationary or vehicle related applications can pose additional challenges due to geometric constraints. Some of these issues may be caused by an insufficient rate of evaporation and mixing of the injected liquid reductant with the exhaust gases as compared to the effective length of the mixing region. For example, where the liquid reductant is not sufficiently evaporated and mixed with the exhaust gases before reaching the catalyst, drops of liquid may be deposited onto the catalyst, which may leave residue upon evaporation and may eventually lead to degradation of the catalyst.

As set forth by the present disclosure, an exhaust system for an internal combustion engine for a vehicle is provided. The exhaust system comprises an exhaust passage for transporting exhaust gases from the engine; an injector coupled to a wall of the exhaust passage, said injector including an injection axis that is angled relative to a longitudinal axis of a mixing region of the exhaust passage; and a first mixing device arranged within the exhaust passage downstream of the injector within the mixing region, said first mixing device including a plurality of flaps, wherein said plurality of flaps are inclined relative to the longitudinal axis; a second mixing device arranged within the exhaust passage downstream of the first mixing device; wherein the injection axis of the injector intersects the first mixing device. As one example, the second mixing device may be configured as a helical mixer for increasing the distance of travel of the liquid reductant and exhaust gases flowing through the exhaust passage.

In this way, by utilizing the synergistic effects of the first mixing device for redirecting and increasing break-up of the liquid reductant and the second mixing device arranged downstream of the first mixing device, the reductant may be sufficiently mixed with exhaust gases produced by the engine before reaching a catalyst even where a relatively course spray is used by the injector, thereby reducing the amount of unmixed reductant deposited on the catalyst or walls of the exhaust passage and enabling a reduction in injector cost.

BRIEF DESCRIPTION OF THE DRAWINGS

FIG. 3 illustrates a cross-sectional view of the exhaust system of FIG. 1.

FIGS. 4 and 5 illustrate a cross-sectional view of a first mixing device configured as a flap mixer describing a relationship between an orientation of the first mixing device and an orientation of an injector.

DETAILED DESCRIPTION

Figure 1:
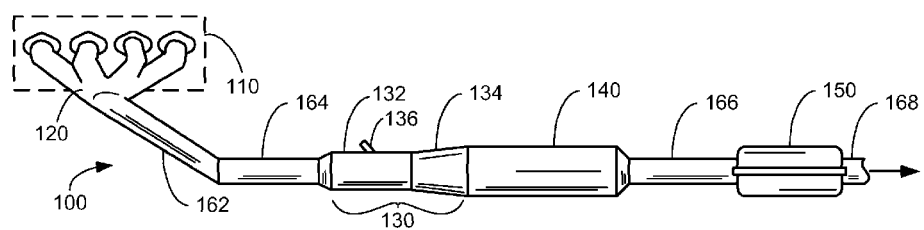
FIG. 1 illustrates an exhaust system for transporting exhaust gases produced by internal combustion engine.

FIG. 1 illustrates an exhaust system 100 for transporting exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. In some embodiments, engine 110 may be configured in a propulsion system for a vehicle. However, in other embodiments, engine 110 may be operated in a stationary application such as an electric generator, for example. While exhaust system 100 may be applicable to stationary applications, it should be appreciated that exhaust system 100 as described herein, is particularly adapted for vehicle applications, particularly where geometric limitations limit the mixing region of the exhaust gases and reductant.

Exhaust system 100 may include one or more of the following: an exhaust manifold 120 for receiving exhaust gases produced by one or more cylinders of engine 110, a mixing region 130 arranged downstream of exhaust manifold 120 for receiving a liquid reductant, a selective catalytic reductant (SCR) catalyst 140 arranged downstream of the mixing region 130, and a noise suppression device 150 arranged downstream of catalyst 140. Additionally, exhaust system 110 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. Catalyst 140 may be fluidically coupled to noise suppression device 150 by exhaust passage 166. Finally, exhaust gases may be permitted to flow from noise suppression device 150 to the surrounding environment via exhaust passage 168. Note that while not illustrated by FIG. 1, exhaust system 100 may include a particulate filter and/or diesel oxidation catalyst arranged upstream or downstream of catalyst 140. Furthermore, it should be appreciated that exhaust system 100 may include two or more catalysts.

In some embodiments, mixing region 130 can include a greater cross-sectional area or flow area than upstream exhaust passage 164. Mixing region 130 may include a first portion 132 and a second portion 134. The first portion 132 of mixing region 130 may include an injector 136 for selectively injecting a liquid into the exhaust system. As one non-limiting example, the liquid injected by injector 136 may include a liquid reductant such as ammonia or urea. The second portion 134 of mixing region 130 may be configured to accommodate a change in cross-sectional area or flow area between the first portion 132 and the catalyst 140. Note that catalyst 140 can include any suitable catalyst for reducing NOx or other products of combustion resulting from the combustion of fuel by engine 110.

Note that with regards to vehicle applications, exhaust system 100 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIG. 1 or may omit components described herein.

Figure 2:
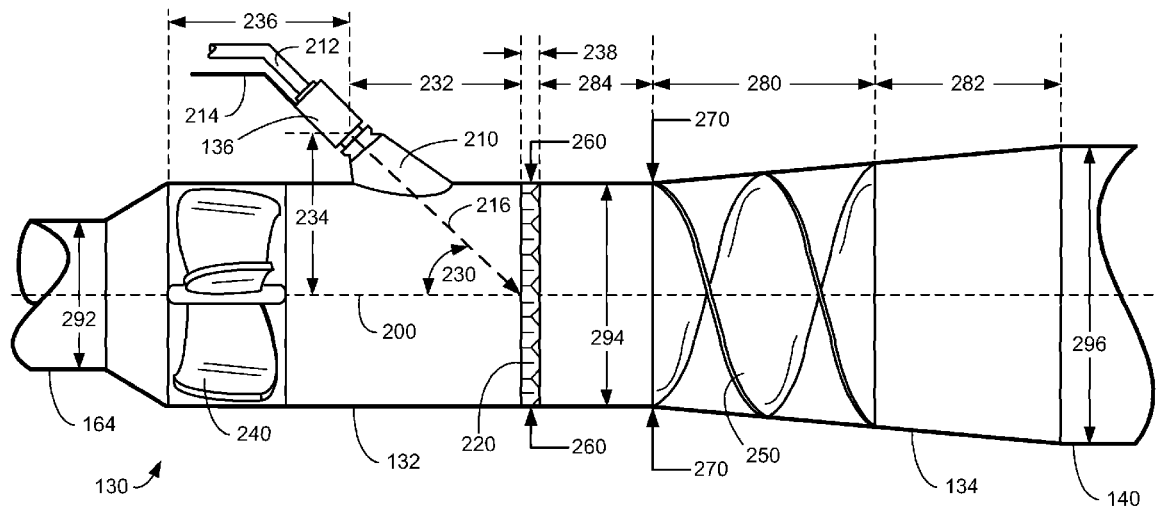
FIG. 2 illustrates a side view of the exhaust system of FIG. 1 in greater detail as a longitudinal cross-section.

FIG. 2 illustrates a side view of mixing region 130 in greater detail as a longitudinal cross-section. A center longitudinal axis of mixing region 130 is indicated at 200. Injector 136 is shown coupled to a wall of the first portion 132 of mixing region 130 by an injector boss 210. In this example, injector 136 is external the flow area of the exhaust passage. In this way, the injector may be protected from thermal degradation, which may be caused by high temperature exhaust gases. Further, as the injector may be recessed beyond the wall of the exhaust passage via the injector boss, interruption of the exhaust flow by the injector may be reduced. Injector 136 can inject, through an opening in the wall of the mixing region, a liquid supplied to it by conduit 212 in response to a control signal received via communication line 214 from an electronic control system of engine 110. The liquid may be supplied to injector 136 through conduit 212 from a storage tank via an intermediate pump. Note that the pump may also be controlled by an electronic control system of engine 110 to provide suitably pressurized reductant to injector 136.

Injector 136 can be oriented to inject the reductant toward a first mixing device 220 along an injection axis 216 as a spray. As one non-limiting example, first mixing device 220 may be configured as a flap mixer that includes a plurality of angled flaps or deflecting elements configured to redirect the injected reductant and facilitate break-up of the spray into smaller droplets. A non-limiting example of first mixing device 220 having a flap mixer configuration is described in greater detail with reference to FIG. 9. In some embodiments, injection axis 216 can be coincident with a center of the spray pattern provided by injector 136. The spray pattern provided by injector 136 may include an suitable pattern for improving the mixing and evaporation rate of the reductant with the exhaust gases. For example, an injector can provide sprays that form sheets, filled cones, hollow cones, multiple cones, etc.

As one non-limiting example, the spray pattern provided by injector 136 may include three cones having an equidistant spacing from each other, whereby the center-line of each of the three cones forms a triangle. For example, the injector may be oriented to direct the spray pattern including the three filled cones onto the first mixing device such that an equilateral triangle formed by the cone center-lines is oriented as shown in FIG. 5 at 510, 520, and 530. Each of cones 510, 520, and 530 can be angled at approximately 9 degrees from each other for a total spray angle of approximately 20 degrees. However, it should be appreciated that other suitable spray patterns may be utilized.

The combination of the first and second mixing devices described herein can be used to enable the injection of liquid reductant via injector 136, without requiring an air assisted injector that uses compressed air to assist in vaporization of the liquid spray. In this way, the cost and/or complexity of the injector may be reduced. However, it should be appreciated that the approaches described herein may be used with air assist in other embodiments.

Injection axis 216 can be directed at a particular region of first mixing device 220. As one non-limiting example, injection axis 216 can intersect the center of first mixing device 220, which may also be coincident with longitudinal axis 200.

In this example, injector boss 210 is configured to couple injector 136 to the wall of the exhaust system so that injection axis 216 is angled relative to longitudinal axis 200 at an angle indicated by 230. As one non-limiting example, angle 230 may be an angle of approximately 45 degrees. As another example, angle 230 may be an angle between 20 degrees and 55 degrees. For example, angle 230 may be approximately 30 degrees. However, it should be appreciated that other suitable angles may be utilized.

Note that the angles described herein may be with reference to a particular flow condition. For example, the angle of injection axis 216 as described above may be measured with reference to a condition where there is no exhaust flow. As the flow of exhaust gases increase, the spray pattern provided by the injector may change as the liquid reductant is entrained by the exhaust gases.

In some examples, geometric constraints associated with an exhaust system may serve to increase the rate at which evaporation and mixing of the reductant with the exhaust gases is to be performed so that the reductant is sufficiently atomized prior to reaching the catalyst. Further, some exhaust system configurations may require that the drops of liquid within the spray be less than a particular size to achieve a particular rate of evaporation and/or mixing of the liquid into the exhaust gases. As one non-limiting example, for some exhaust systems, the drops of liquid within the spray must be less than 40 microns in diameter. However, the price of an injector may increase in proportion to a decreasing size of the drops of liquid provided by its spray. Thus, in order to reduce cost of the injector, it may be desirable to improve mixing and evaporation rates so that an injector providing a spray having larger drops of liquid may be used. Furthers still, deposition of reductant onto the wall surfaces and catalyst of the exhaust system should be reduced to avoid formation of deposits upon evaporation of the liquid from these surfaces.

First mixing device 220 can be configured with a plurality of flaps or deflecting elements for redirecting the liquid spray along a trajectory that is substantially more parallel to the exhaust flow than injection axis 216. In this way, the spray may be prepared for the second mixing device. As one example, first mixing device 220 can be optimized to improve spray dispersion over the cross-section of the mixing region before entering a second downstream mixing device, such as second mixing device 250. Additionally, first mixing device 220 can increase breakup of the droplets of the liquid spray as it impacts the flaps or deflecting elements. First mixing device 220 as illustrated in FIG. 2 may include a longitudinal width or thickness indicated at 238 and can partially or completely occupy the cross-sectional area or flow area of the first portion 132 of mixing region 130. An example cross-section 260 through first mixing device 220 along a plane orthogonal to the longitudinal axis of the mixing region is illustrated in greater detail with reference to FIGS. 4 and 5.

As FIG. 2 illustrates injection axis 216 inclined at an angle of approximately 45 degrees, the longitudinal distance between the point of injection and first mixing device 220, as indicated by 232, can be equal to the distance between the point of injection and longitudinal axis 200, as indicated at 234. However, where injection axis 216 is inclined at a different angle relative to longitudinal axis 200, first mixing device 220 may be arranged at a different distance from the point of injection in order that injection axis 216 is directed at a particular region of first mixing device 220, such as, for example, the center of the mixing device, at least during some exhaust flow conditions. Thus, if angle 230 is instead inclined at 30 degrees, longitudinal distance 232 may be increased relative to distance 234 so that injector axis 216 remains directed at the center of first mixing device 220. In this manner, dimensions 232, 234, and 230 may be selected so that injection axis 216 is directed at a particular region of first mixing device 220.

In some embodiments, mixing region 130 may include an upstream mixing device 240 having a leading edge arranged upstream of the point of injection by a longitudinal distance indicated by 236. Note that in some embodiments, upstream mixing device 240 may be omitted. Mixing device 240 can be configured to induce turbulence or increase turbulence in the flow of exhaust gases to improve mixing of the liquid that is injected downstream of mixing device 240 by injector 136. Mixing device 240 may include one or more turbulence inducing fins mounted according to an optimized rotational and longitudinal relationship with reference to the location of injection of the liquid reductant. Where the spray pattern provided by injector 136 includes more than one jet, the arrangement of the fins associated with mixing device 240 may be selected to provide a turbulence pattern that is suited to enhance breakup and mixing of the spray, reducing evaporation time, and hence evaporation distance along the longitudinal length of mixing region 130.

In some embodiments, a second mixing device 250 may be arranged downstream of first mixing device 220. As illustrated in FIG. 1, second mixing device 250 may be configured in an expanding region of the second portion 134 of mixing region 130. As one non-limiting example, second mixing device 250 may include a helical configuration. The helical configuration can be used to force the exhaust gases and the entrained droplets of the injected liquid to follow a longer path along or around the second mixing device, which can increase the evaporation time of the liquid. In this way, mixing of the exhaust gases and the injected liquid can be improved, thereby enabling a reduction in the longitudinal distance between the injector and the face of the SCR catalyst as indicated by the summation of distances 232, 238, 284, 280, and 282. The resulting increase in the rate of mixing and evaporation of the liquid may be used to enable an increase in the size of the droplets of the liquid spray provided by the injector, thereby enabling a reduction in the cost of the injector, at least with some conditions.

Figure 6:
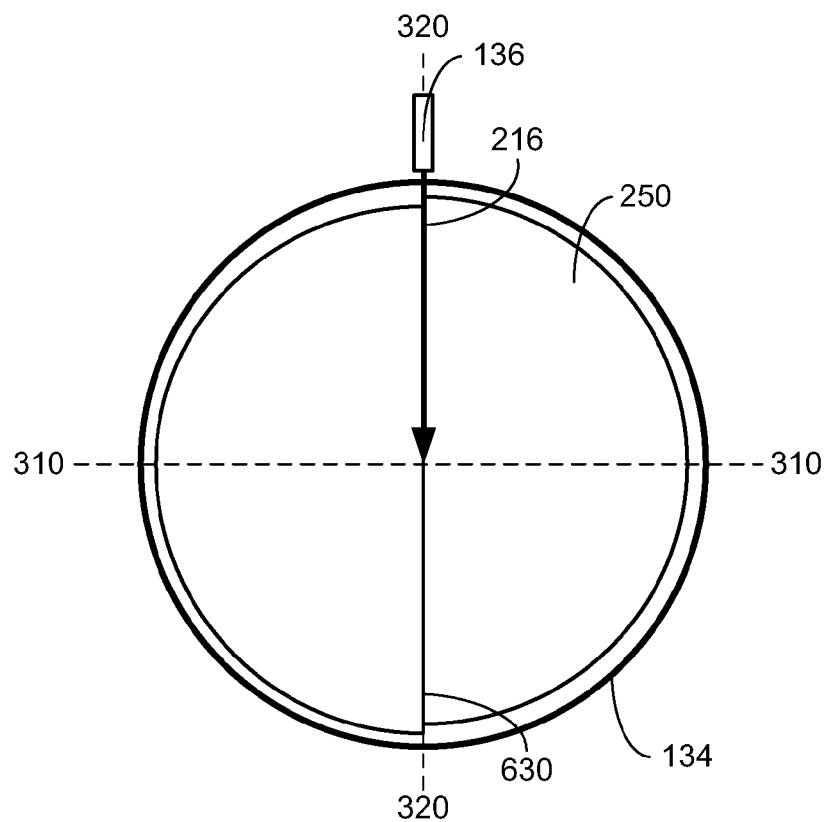
FIGS. 6 and 7 illustrate a cross-sectional view of a mixing device describing a relationship between an orientation of a helical mixing device and an orientation of the injector.
Figure 7:
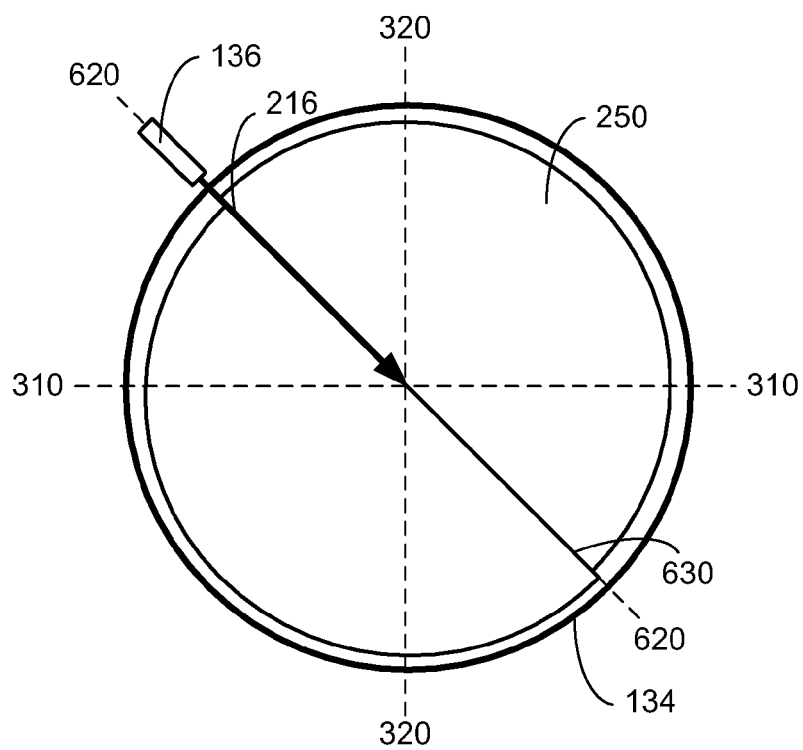

An example cross-section 270 of mixing device 250 is illustrated in greater detail with reference to FIGS. 6-8. As a more specific example of a helical mixer, mixing device 250 may include a substantially thin wall or plate having a 360 degree twist along its longitudinal length as indicated by 280. However, it should be appreciated that second mixing device 250 may have a twist that is greater than or less than 360 degrees across its longitudinal length. In some embodiments, second mixing device 250 may be omitted.

Note that in some embodiments, second mixing device 250 may occupy only a portion of the longitudinal length of the expanding second portion 134 of mixing region 130. The longitudinal distance between second mixing device 250 and the face of SCR catalyst 140 is indicated by 282. As one example, second mixing device 250, having a longitudinal length indicated by 280, may be arranged near or at the upstream end of the expanding second portion 134 having a total longitudinal length including the summation of lengths 280 and 282. Similarly, first mixing device 220 may be arranged at a longitudinal distance upstream from an upstream end of expanding region 134 and/or second mixing device 250 as indicated by 284.

A non-limiting example of a specific embodiment of the exhaust system illustrated in FIG. 2 will be described. Exhaust system 100 may include exhaust passage 164 as defined by diameter 292, first portion 132 as defined by diameter 294, and second portion 134 transitioning between diameter 294 and the diameter 296 of SCR catalyst 140 each having substantially circular cross-sections or flow areas. As one example, diameter 292 may be approximately 4 inches, diameter 294 may be approximately 6 inches, and diameter 296 may be approximately 8 inches. The longitudinal length between the point of injection and the upstream end of expanding region 134 as defined by the summation of 232, 238, and 284 may be approximately 8 inches in length. The longitudinal length of expanding region 134 may be approximately 11 inches in length. The length of mixing device 250 may be approximately 5.6 inches in length as indicated by 280. This example embodiment, when utilized with a 45 degree injection angle of liquid including ammonia, can be used to achieve an ammonia or urea concentration uniformity with the exhaust gases in excess of 95% at the upstream face of SCR catalyst 140, at least under some conditions. As another example, the ammonia or urea concentration uniformity with the exhaust gases may be in excess of 90%. Thus, the conversion of NOx by the SCR catalyst may be improved while reducing the deposition of residues from the injected liquid.

It should be appreciated that the above specific embodiment is merely one example of the relative dimensions that may be used, and that the present disclosure enables different dimensions or configurations to be used. Furthermore, it should be appreciated that one or more of the various exhaust system components may include flow areas or cross-sections that have shapes that are non-circular. For example, cross-sections of the exhaust components may include shapes that are ovals, rectangles, squares, or other suitable shapes.

FIG. 3 illustrates a cross-sectional view of mixing region 130 as viewed from a vantage point located downstream of injector 136 through a plane orthogonal to the longitudinal axis of the mixing region. In this particular example, injector 136 is angled at approximately 45 degrees with reference to vertical axis 320 and horizontal axis 310. Thus, injector 136 is clocked at 1:30 relative to vertical axis 320. Injection axis 216 is directed toward the centerline or longitudinal axis of the mixing region as defined by the intersection of axis 310 and 320. However, it should be appreciated that injection axis 216 may be directed toward other areas of the mixing region.

Injector 136 may be oriented or clocked at any suitable angle relative to the mixing region. For example, the injector may be clocked within a first range indicated by 330. In this particular example, the first range 330 is bounded by vertical axis 320 and a line 340 angled at approximately 5 degrees relative to horizontal axis 3 10. Similarly, a second range 350 for the orientation of injector 136 may be bounded by vertical axis 320 and a line 360 angled approximately 5 degrees relative to horizontal axis 310. Thus, in this particular embodiment, the orientation of injector 136 may be within 85 degrees of vertical axis 320 along the upper portion of the exhaust system. However, it should be appreciated that other orientations may be used such as, for example, at approximately 90 degrees relative to the vertical axis or within 180 degrees of the vertical axis.

By orienting the injector along the upper wall of the mixing region as indicated by regions 330 and 350, accumulation of the liquid at the injector or injector boss may be reduced by relying, in part, on the force of gravity to entrain any remaining liquid into the flow of the exhaust gases. In this way, accumulation of liquid and/or deposition of residue at the injector or injector boss may be reduced.

FIGS. 4 and 5 illustrate a cross-sectional view of mixing region 130 from a vantage point located downstream of injector 136 through section 260 as illustrated by FIG. 2. FIGS. 4 and 5 illustrate examples where first mixing device 220 is configured as a flap mixer, which may be oriented or clocked in relation to injection axis 216 by an angle indicated by 410. FIG. 4, for example, illustrates injector 136 at a similar orientation as FIG. 3 or approximately 45 degrees relative to vertical axis 320. In other words, injector 136 is clocked at approximately 1:30 when viewed from a vantage point located downstream of injector 136. In this particular example, first mixing device 220 is oriented or clocked so that an axis 420 of the first mixing device is coincident with vertical axis 320. Thus, axis 420 of first mixing device 220 is angled at approximately 45 degrees relative to injection axis 216 along section 260 for this particular mixer so that the spray provided by injector 136 may be redirected from the angled injection axis along the exhaust passage. In this way, by redirecting the spray, wall wetting may be reduced and spray dispersion may be improved for sprays having an injection axis that is angled relative to the flow of exhaust gases.

Furthermore, by orienting the injection axis at 45 degrees or other suitable angle relative to the axis of the first mixing device along both the longitudinal axis of the mixing region as illustrated by FIG. 2 and along section 260 as illustrated by FIG. 4, the first mixing device can redirect the injected liquid along the flow direction of the exhaust gases. For example, first mixing device 220 can include a plurality of flaps or deflecting elements having an angle that is coordinated with the injection angle in both of the planes illustrated by FIGS. 2 and 4 so that the injected liquid may be redirected along a direction substantially more parallel to longitudinal axis 200 and with improved dispersion. Furthermore, by orienting the injector at an angle relative to the 12:00 position, clearance between the exhaust passage and other vehicle components may be reduced, thereby providing increased design flexibility within the geometric constraints of the vehicle.

FIG. 5 illustrates how first mixing device 220 configured as a flap mixing device can be oriented or clocked relative to the position of injector 136 by angle 410 as the injector is oriented at a different position relative to mixing region 132. For example, as illustrated by FIG. 5, injector 136 is clocked at 12:00 and provides an injection axis coincident with vertical axis 320. In turn, axis 420 of first mixing device 220 may be angled relative to injection axis 216 by angle 410. Thus, first mixing device 220 may clocked at 10:30 to retain a similar angle of redirection of the incident spray. In this way, angle 410 may be maintained between injection axis 216 and axis 420 so that the first mixing device receives the injected liquid at an appropriate angle and redirects the liquid so that it more closely parallels the flow of exhaust gases. While FIGS. 4 and 5 illustrate only two example angles, it should be appreciated that injector 136 and injector axis 216 may be clocked at any suitable orientation with reference to mixing region 132. First mixing device 220 may be oriented relative to injector 136 and injector axis 216 based on the particular flap configuration to provide optimum mixing, redirection, and dispersion of the injected liquid. Thus, while angle 410 is approximately 45 degrees in the above examples, other suitable angles may be used based on the particular flap orientation. For example, angle 410 may be between 55 degrees and 20 degrees, or other suitable angle FIGS. 6 and 7 illustrate a cross-sectional view of mixing region 130 facing downstream from a vantage point located at section 270 as illustrated by FIG. 2. FIGS. 6 and 7 illustrate how second mixing device 250 configured as a helical mixer can be clocked or oriented relative to injector 136 and/or injection axis 216. For example, as illustrated by FIG. 6, injection axis 216 of injector 136 is coincident with vertical axis 620, which may also be referred to as the 12:00 position.

A leading edge 630 of mixing device 250 may be oriented along the same axis as injection axis 216. FIG. 7 illustrates an example where the injection axis is angled or clocked relative to the vertical axis. For example, injection axis 216 and axis 620 of mixing device 250 may be oriented at 45 degrees relative to vertical axis 320 or clocked at 10:30. Thus, leading edge 270 of second mixing device 250 may be coincident with injection axis 216 to achieve optimal mixing of the liquid spray. Note that mixing device 250 may be oriented relative to the position of the injector and the injection axis for any suitable orientation or clocking. Further, it should be appreciated that the orientation of mixing device 250 may be rotationally offset relative to the orientation of injection axis 216, for example, as illustrated by first mixing device 220 in FIGS. 4 and 5. Thus, it should be appreciated that second mixing device 250 may be oriented at any suitable angle relative to the injection axis.

Figure 8:
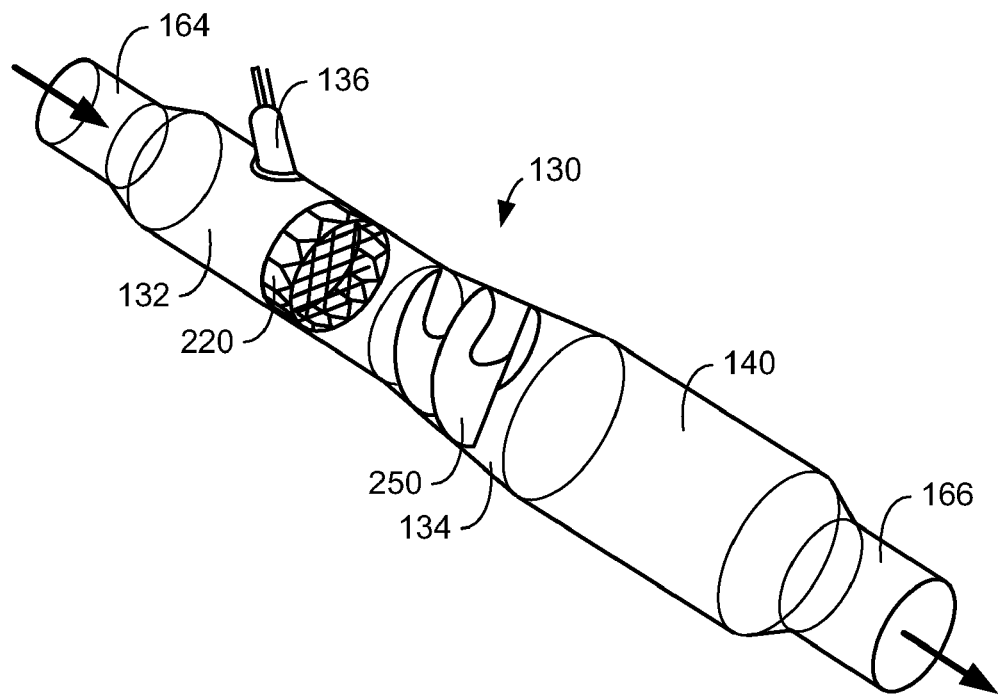
FIG. 8 illustrates an additional embodiment of an exhaust system.

FIG. 8 provides an additional view of mixing region 130 as described herein including injector 136 having an injection axis inclined relative to the longitudinal axis of the first portion 132 and the second portion 134 of mixing region 130, and a first mixing device 220 configured as a flap mixer arranged upstream of second mixing device 250 configured as a helical mixer for improving evaporation and mixing of the injected liquid reductant with exhaust gases flowing through the exhaust system before reaching catalyst 140. Further, in this embodiment, mixing device 240 has been omitted.

Figure 9:
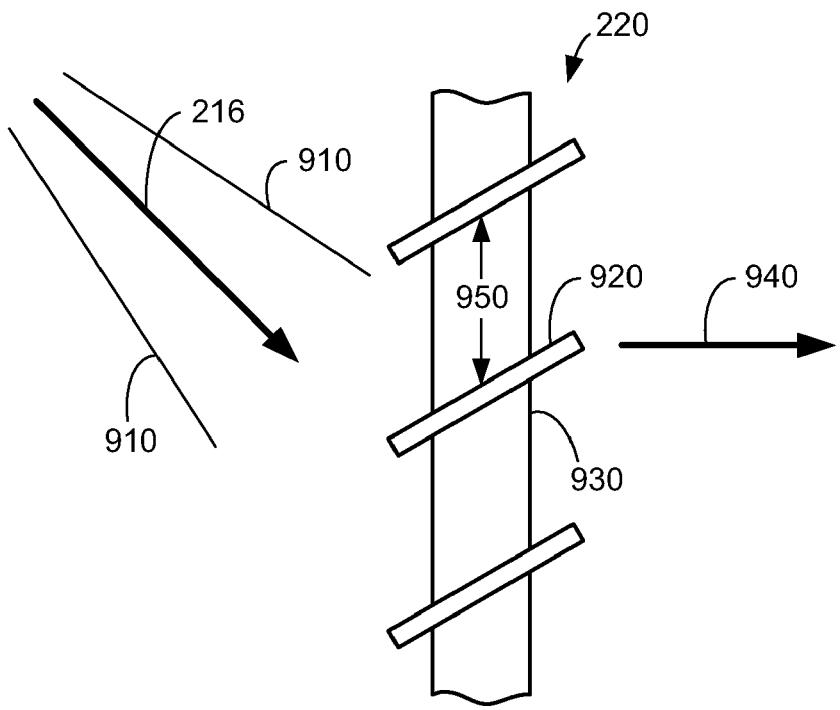
FIG. 9 illustrates an example first mixing device of FIG. 2 in greater detail.

FIG. 9 shows an example of first mixing device 220 in greater detail and configured as a flap mixer. Mixing device 220 in this example, includes a plurality of angled flaps 920 coupled to a frame 930. Flaps 920 are spaced apart from each other by a distance indicated by 950. While only three flaps are illustrated in FIG. 9, first mixing device 220 may include 2, 4, 5, 6, 7, 8, 9, 10, or more flaps. Injection axis 216 is shown defining a center of spray 910, which is directed onto first mixing device 220. As spray 910 strikes flaps 920, the spray is redirected along the direction indicated by 940, which can be parallel to or more parallel to the longitudinal axis of the mixing region than injection axis 216. Note that the configuration shown in FIG. 9 is merely one example of first mixing device 220 and that other configurations are possible.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An exhaust system for an internal combustion engine for a vehicle, comprising:
   an exhaust passage for transporting exhaust gases from the engine;

an injector coupled to a wall of the exhaust passage, said injector including an injection axis that is angled relative to a longitudinal axis of a mixing region of the exhaust passage, wherein the injection axis defines a center of a spray pattern of a liquid reductant injected by the injector and the spray pattern includes three cones;

a first mixing device arranged within the exhaust passage downstream of the injector within the mixing region, said first mixing device including a plurality of flaps, wherein said plurality of flaps are inclined relative to the longitudinal axis; and a second mixing device arranged within the exhaust passage downstream of the first mixing device;

wherein the injection axis of the injector intersects the first mixing device.

2. The exhaust system of claim 1, wherein the plurality of flaps are configured to redirect a spray injected by the injector in a direction more parallel to the longitudinal axis than the injection axis.

3. The exhaust system of claim 1, further comprising a third mixing device arranged within the exhaust passage upstream of the injector for inducing turbulence in the exhaust gases flowing past the third mixing device.

4. The exhaust system of claim 1, wherein the injector is coupled to the wall of the exhaust passage external a flow area of the exhaust passage so that the injector does not protrude into the flow area of the exhaust passage.

5. The exhaust system of claim 1, wherein the mixing region between the injector and the first mixing device has a greater flow area than the exhaust passage upstream of the injector.

6. The exhaust system of claim 1, wherein the injection axis intersects the first mixing device at approximately the center of the first mixing device.

7. The exhaust system of claim 1, wherein the liquid reductant includes ammonia.

8. The exhaust system of claim 1, wherein the liquid reductant includes urea.

9. The exhaust system of claim 1, further comprising a catalyst arranged along the exhaust passage downstream of the second mixing device.

10. The exhaust system of claim 1, wherein the injector is coupled to an upper section of the wall of the exhaust passage.

11. The exhaust system of claim 1, wherein the angle between the injection axis and the longitudinal axis of the exhaust passage is between 20 degrees and 55 degrees.

12. The exhaust system of claim 11, wherein the angle between the injection axis and the longitudinal axis of the exhaust passage is approximately 45 degrees.

13. The exhaust system of claim 1, wherein the second mixing device has a helical configuration.

14. The exhaust system of claim 13, wherein the helical configuration of the second mixing device includes at least one surface that is rotated at least 360 degrees along the longitudinal axis.

15. The exhaust system of claim 13, wherein the second mixing device is arranged in an expanding region of the exhaust passage.

16. An exhaust system for a diesel fuel burning internal combustion engine of a vehicle, comprising:

an exhaust passage having a first end coupled to the engine;

a catalyst coupled to a second end of the exhaust passage configured to receive exhaust gases produced by the engine;

an injector coupled to a wall of the exhaust passage configured to inject a liquid reductant including ammonia into the exhaust gases flowing through the exhaust passage, wherein an injection axis of the injector is oriented at an angle relative to a longitudinal axis of a mixing region of the exhaust passage;

a first mixing device arranged within the mixing region of the exhaust passage downstream of the injector, wherein said first mixing device includes a plurality of flaps spaced apart from each other for redirecting the liquid injected by the injector along the longitudinal axis of the exhaust passage; and a second mixing device having a helical configuration arranged within an expanding region of the exhaust passage downstream of the first mixing device.

17. The exhaust system of claim 16, wherein the plurality of flaps of the first mixing device are arranged in a single vertically aligned column and each of the flaps are angled, axial to the trajectory of redirected liquid injected by the injector, and wherein the second mixing device is a helicoid.

18. The exhaust system of claim 16, wherein the angle between the injection axis and the longitudinal axis is approximately 45 degrees and wherein the injector does not substantially protrude into a flow area of the exhaust passage.

19. The exhaust system of claim 18, wherein the injector is recessed beyond a wall of the exhaust passage by coupling to an injector boss, which is further coupled to the wall of the exhaust passage.

20. A method of treating exhaust gases produced by a diesel fuel burning internal combustion engine, the method comprising:

combusting at least air and diesel fuel in the internal combustion engine to produce a flow of exhaust gases in an exhaust passage of the engine;

selectively injecting a liquid reductant onto a flap mixer within the exhaust passage at a first angle relative to a longitudinal axis of the exhaust passage from an injector substantially external to a flow area of the exhaust passage in response to an operating condition of the engine;

redirecting the reductant injected at the first angle at a second angle relative to the longitudinal axis via the flap mixer, wherein the second angle is less than the first angle;

expanding the redirected reductant and exhaust gases while passing the reductant and the exhaust gases through a helical mixing device arranged within the exhaust passage downstream of the flap mixer;

receiving the reductant and exhaust gases at a catalyst arranged within the exhaust passage downstream of the helical mixing device;

wherein a reductant concentration uniformity with the exhaust gases received at the catalyst is in excess of 95%.

* * * * *